United States Patent
Helmers

(10) Patent No.: US 10,180,068 B2
(45) Date of Patent: Jan. 15, 2019

(54) GAS TURBINE UNIT

(71) Applicant: Siemens Aktiengesellschaft, Munich (DE)

(72) Inventor: Lennard Helmers, Mülheim a.d. Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 55 days.

(21) Appl. No.: 15/524,352

(22) PCT Filed: Nov. 5, 2015

(86) PCT No.: PCT/EP2015/075844
§ 371 (c)(1),
(2) Date: May 4, 2017

(87) PCT Pub. No.: WO2016/078927
PCT Pub. Date: May 26, 2016

(65) Prior Publication Data
US 2018/0291745 A1 Oct. 11, 2018

(30) Foreign Application Priority Data
Nov. 18, 2014 (EP) .................................... 14193696

(51) Int. Cl.
*F01D 5/08* (2006.01)
*F02C 7/18* (2006.01)

(52) U.S. Cl.
CPC ............... *F01D 5/087* (2013.01); *F02C 7/18* (2013.01); *F05D 2260/232* (2013.01)

(58) Field of Classification Search
CPC .... F02C 7/18; F02C 6/08; F01D 5/085; F01D 5/087; F01D 25/08; F05D 2260/232
See application file for complete search history.

(56) References Cited

U.S. PATENT DOCUMENTS 2,837,270 A * 6/1958 Chapman ............ F04D 27/0215
                                                                415/145
5,611,197 A * 3/1997 Bunker .................. F02C 7/185
                                                                415/115

(Continued)

FOREIGN PATENT DOCUMENTS

DE          69715393 T2     5/2003
DE         102012011294 A1  12/2012

OTHER PUBLICATIONS

EP Search Report dated May 6, 2015, for EP patent application No. 14193696.3.

(Continued)

*Primary Examiner* — Carlos A Rivera
(74) *Attorney, Agent, or Firm* — Beusse Wolter Sanks & Maire

(57) ABSTRACT

A gas turbine unit having a compressor section, a combustion chamber section containing at least one combustion chamber, and a turbine section, wherein, starting from a compressor inlet, a flow path extends. The gas turbine unit is equipped with at least one first and one second cooling air path. The first cooling air path draws off compressed air from the flow path upstream of the at least one combustion chamber. The first cooling air path has a higher pressure level than the second cooling air path and feeds the cooling air. The second cooling air path has a draw-off point in the compressor section, and extends from the compressor section to the turbine section, bypassing the at least one combustion chamber. After components have been cooled, the first cooling air path feeds the cooling air into the second cooling air path at an infeed point as additional cooling air.

2 Claims, 3 Drawing Sheets

(56) References Cited

U.S. PATENT DOCUMENTS

| | | | | |
|---|---|---|---|---|
| 6,065,282 | A * | 5/2000 | Fukue | F02C 7/185 |
| | | | | 415/115 |
| 6,098,395 | A * | 8/2000 | North | F01D 5/085 |
| | | | | 60/782 |
| 6,786,694 | B2 * | 9/2004 | Tiemann | F02C 7/185 |
| | | | | 415/1 |
| 8,240,975 | B1 * | 8/2012 | Ryznic | F02C 6/08 |
| | | | | 415/1 |
| 8,475,112 | B1 * | 7/2013 | Ryznic | F02C 6/08 |
| | | | | 415/1 |
| 8,794,907 | B1 * | 8/2014 | Brostmeyer | F02C 6/08 |
| | | | | 415/1 |
| 9,714,611 | B2 * | 7/2017 | Mayer | F02C 7/12 |
| 2002/0148233 | A1 * | 10/2002 | Tiemann | F01D 5/187 |
| | | | | 60/806 |
| 2010/0303616 | A1 * | 12/2010 | Chir | F02C 6/08 |
| | | | | 415/178 |
| 2011/0072827 | A1 * | 3/2011 | Ciofini | F01D 5/082 |
| | | | | 60/772 |
| 2013/0036747 | A1 * | 2/2013 | Fuchs | F01D 5/187 |
| | | | | 60/782 |

OTHER PUBLICATIONS

International Search Report dated Feb. 9, 2016, for PCT/EP2015/075844.

* cited by examiner

GAS TURBINE UNIT

CROSS REFERENCE TO RELATED APPLICATIONS

This application is the US National Stage of International Application No. PCT/EP2015/075844 filed Nov. 5, 2015, and claims the benefit thereof. The International Application claims the benefit of European Application No. EP14193696 filed Nov. 18, 2014. All of the applications are incorporated by reference herein in their entirety.

FIELD OF INVENTION

The present invention relates to a gas turbine unit. In particular, the invention relates to a gas turbine unit having a cooling system for cooling components of the gas turbine unit which are subject to high temperatures during operation of the gas turbine unit.

BACKGROUND OF INVENTION

Gas turbine components which are subject to high temperatures during operation of a gas turbine unit are for example the guide vanes and rotor blades of the turbine, wall sections of the turbine casing bounding the hot gas path through the turbine, and sections of the rotor bounding the hot gas path through the turbine. In order to increase the high-temperature strength of components, these are generally provided with a ceramic thermal barrier coating system which often consists of a ceramic thermal barrier coating and, below this, an adhesion-promoting layer, wherein the adhesion-promoting layer also serves for corrosion prevention and/or oxidation prevention. Thermal barrier coating systems of this kind make it possible to lower the temperature in the base material of the turbine components in comparison to the temperature at the surface of the coating system. In addition, in order to be able to reach even higher operating temperatures for the gas turbine unit, heat is removed from components subject to particularly high thermal load by passing cooling air through these components.

Methods for cooling a gas turbine are known for example from DE 102012011294 A1 or U.S. Pat. No. 5,611,197, both of which prescribe supplying compressor air via a cooling air path to components in the turbine section that are subject to high thermal load. After acting on the components in the turbine section, the cooling air is then passed back into a return line in order to be returned to the flow path in the compressor section. In this context, injection into the flow path takes place at a location upstream of the point at which the compressor air was originally taken.

However, components of the gas turbine unit which do not come into direct contact with the hot working medium in the flow path of the gas turbine, such as rotor sections located in the burner section of the gas turbine unit, are also exposed to high temperatures during operation of the gas turbine unit. Such components are also often cooled with cooling air. The air required for cooling the gas turbine components is taken from the compressor air at bleed points in the compressor of the gas turbine unit. After cooling of the gas turbine component to be cooled, the cooling air is supplied to the working medium in the hot gas path.

However, discharging the used cooling air into the hot gas path or into the flow path of the gas turbine unit influences both the aerodynamics in the hot gas path or in the flow path and the efficiency of the gas turbine unit. This is particularly true when—as is often the case nowadays—used cooling air is released at multiple locations into the flow path leading through the gas turbine unit.

SUMMARY OF INVENTION

The present invention therefore has an object of providing a gas turbine unit in which the number of locations at which cooling air is released into the flow path of the gas turbine unit is reduced.

The stated object is achieved by a gas turbine unit as claimed. The dependent claims contain advantageous configurations of the invention.

A gas turbine unit according to the invention is equipped with a compressor section, a combustion chamber section containing at least one combustion chamber, and a turbine section, wherein a flow path extends, proceeding from a compressor inlet, through the compressor section, at least one combustion chamber of the combustion chamber section and the turbine section to a turbine outlet. It is also equipped with at least one first and one second cooling air path which bypass the at least one combustion chamber, wherein the first cooling air path bleeds air from the flow path upstream of the at least one combustion chamber. The cooling air paths guide compressor bleed air as cooling air through or along turbine components in the turbine section and/or in the combustion chamber section, wherein the first cooling air path is at a higher pressure than the second cooling air path and, after cooling the gas turbine components to be cooled by the first cooling air path, feeds the cooling air into the second cooling air path at a feed-in point.

In the gas turbine unit according to the invention, the second cooling air path has a bleed point in the compressor section and extends from the compressor section, bypassing the at least one combustion chamber, to the turbine section, wherein in the compressor section the second cooling air path bleeds air from the flow path and guides this as cooling air through or along turbine components in the turbine section and/or in the combustion chamber section. At a feed-in point, the first cooling air path, after cooling the gas turbine components to be cooled by the first cooling air path, then feeds the cooling air into the second cooling air path as cooling air in addition to the air of the second cooling air path bled in the compressor section from the flow path. The cooling air from the first cooling air path can then, together with the cooling air in the second cooling air path, cool the turbine components that are to be cooled by the second cooling air path. Since the first cooling air path does not discharge the cooling air into the flow path of the gas turbine unit, the first cooling air path can be considered a closed cooling air path.

The gas turbine components that are to be cooled can in particular be rotor blades and/or guide vanes of the turbine, wall sections of the gas turbine casing, sections of the rotor shaft, etc.

Thus, in the gas turbine unit according to the invention, the cooling air in the first cooling air path is not released in the flow path of the gas turbine unit after cooling of the respective gas turbine components, but rather is supplied to the second cooling air path, which is at a lower pressure than the first cooling air path, thus creating at least one closed first cooling air path. The inventive configuration of the gas turbine unit can help to reduce the number of locations at which cooling air from a cooling air path is released into the flow path through the gas turbine unit.

There is in principle the possibility of discharging the cooling air from the second cooling air path into a third cooling air path after cooling of the gas turbine components to be cooled by the second cooling air path, such that the second cooling air path can also be considered a closed cooling air path. Only the cooling air flowing through the final cooling air path, at least part of which has previously flowed through the first and/or the second cooling air path and/or other cooling air paths, is ultimately discharged into the flow path of the gas turbine unit.

The feed-in point in the second cooling air path, at which the cooling air from the first cooling air path is discharged into the second cooling air path after cooling of the corresponding gas turbine components, can in particular be arranged in a part of the second cooling air path located in the compressor section, downstream of the bleed point of the second cooling air path. In a special configuration of the gas turbine unit, the first cooling air path can then for example lead in sequence through a gap between the rotor and a rotor shroud surrounding the rotor in the combustion chamber section, and through a final guide vane row of the compressor section, to the feed-in point into the second cooling air path. Optionally, the first cooling air path can also lead through the guide vanes of the leading guide vane row of the turbine. The special configuration makes it possible, in particular, to cool the rotor in the region of the combustion chamber section without the cooling air used for cooling having to be released into the flow path of the gas turbine unit in the compressor section. Releasing used cooling air into the flow path in the compressor section of the gas turbine unit is particularly critical since the aerodynamics in the compressor are particularly sensitive to injections of air into the flow path. By virtue of the configuration according to the invention, it is possible to avoid injecting the air into the flow path in the compressor, such that the drawbacks associated therewith do not arise. As an alternative to the position of the feed-in point being in a part of the second cooling air path located in the compressor section, there is also the possibility of arranging the feed-in point in a part of the second cooling air path located in the turbine section, upstream of the gas turbine components to be cooled by the second cooling air path. This is expedient in particular if rotor cooling in the combustion chamber section is not required.

As already indicated above, in the gas turbine unit according to the invention there can be a plurality of cooling air paths, wherein the cooling air paths are at different pressures. After cooling the gas turbine components to be cooled by the cooling air paths, the cooling air of the cooling air paths is then fed, at feed-in points, into that cooling air path having in each case the next-highest pressure. It is thus possible to create a cascade of cooling air paths of successively lower pressure, such that only the cooling air of the final cooling air path need be released into the flow path through the gas turbine unit. Thus, the number of locations at which cooling air is released into the flow path of the gas turbine unit can be reduced to a minimum.

A cooling air path of the gas turbine unit according to the invention can in particular be configured such that it extends through the guide vanes of a certain guide vane row of the turbine, and opens into another cooling air path which extends through the guide vanes of another guide vane row downstream of the guide vane row in question. It is thus possible to provide a cooling air path for the guide vanes which is formed as a closed cooling air path as far as the cooling air path for the guide vane row to be cooled last.

Further features, properties and advantages of the present invention are provided by the description below of exemplary embodiments, with reference to the accompanying figures.

DETAILED DESCRIPTION OF INVENTION

Figure 1:
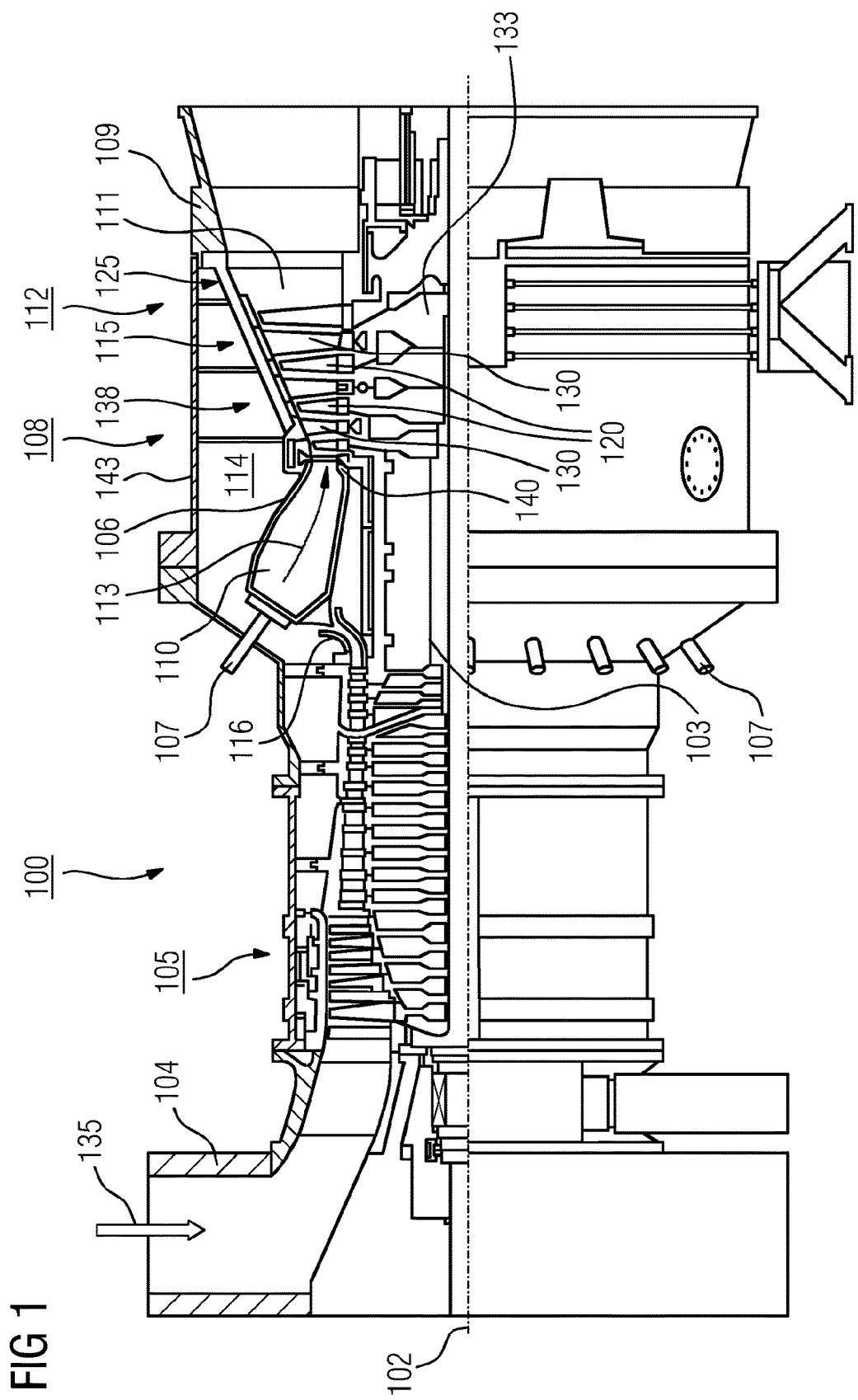
FIG. 1 shows, by way of example, a partial longitudinal section through a gas turbine unit.

FIG. 1 shows, as an example of a gas turbine unit in which the present invention might find application, a static gas turbine unit 100 in partial longitudinal section.

In the interior, the gas turbine unit 100 has a rotor 103 with a shaft 101, which rotor is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103. However, instead of an annular combustion chamber 110, it is also possible for a number of approximately cylindrical combustion chambers to be present in an annular arrangement around the rotor 103. That section of the gas turbine unit 100 in which the combustion chamber 110 is located will hereinafter be referred to as the combustion chamber section 106.

The annular combustion chamber 110 is in communication with a for example annular hot gas duct 111. There, for example four series-connected turbine stages 112 form the turbine 108. Each turbine stage 112 is formed, for example, from two blade or vane rings. As seen in the direction of flow of a working medium 113, in the hot gas duct 111 a row of guide vanes 115 is followed by a row 125 formed from rotor blades 120. The guide vanes 130 are secured to an inner housing 138 of a stator 143, whereas the rotor blades 120 of a row 125 are fitted to the rotor 103 for example by means of a turbine disk 133.

A generator or a working machine (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot gas duct 111 past the guide vanes 130 and the rotor blades 120. The working medium 113 expands at the rotor blades 120, imparting its momentum, so that the rotor blades 120 drive the rotor 103 and the latter drives the working machine coupled to it. Thus, a flow path which serves to generate and provide the working medium for the turbine passes through the compressor 105, the combustion chamber 110 and the turbine 108.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses. To be able to withstand the temperatures which prevail there, they are cooled by means of cooling air. Also cooled are linings of the hot gas duct 111 and/or the rotor 103 in the region of the combustion chamber section, that is to say in that section of the gas turbine unit in which the annular combustion chamber 110 or the number of essentially cylindrical combustion chambers is or are located.

Figure 2:
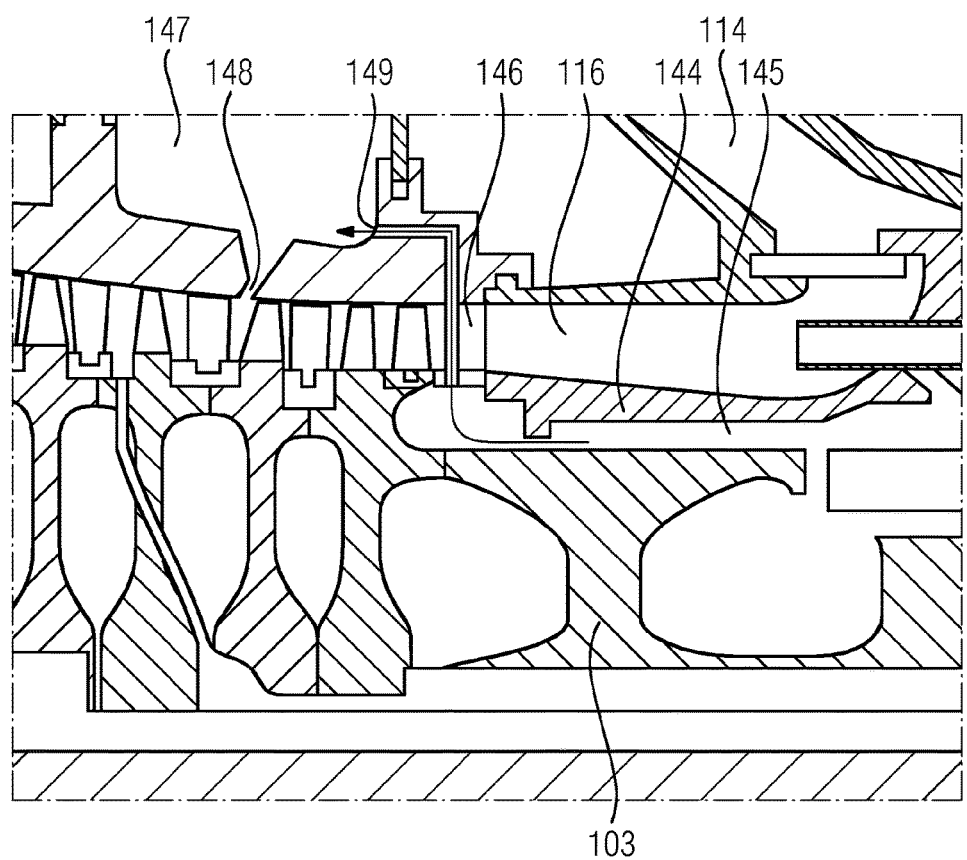
FIG. 2 shows a first exemplary embodiment of a cooling air path in a gas turbine unit according to the invention.

There follows a more detailed description of the first cooling air path of the gas turbine unit 100, with reference to FIG. 2. This cooling air path extends from the compressor outlet 116 through a combustion chamber plenum 114, through the first guide vane row 130, that is to say through that guide vane row 130 which, in the turbine section 108, is the first after the combustion chamber 110, and through an annular gap 145 formed in the region of the combustion chamber section 106 between the rotor 103 and a stationary rotor shroud 144, and finally through the guide vanes 146 of the last guide vane row of the compressor 105. Thence, the cooling air of the first cooling air path is fed into a plenum 147 which is part of a second cooling air path and which is supplied with compressor air by a bleed point 148 positioned upstream of the compressor outlet 116. The feed-in point at which the compressor air from the first cooling air path is fed into the plenum 147 of the second cooling air path is located in the second cooling air path upstream of the bleed point 148. It should be noted here that the bleed point for the compressor air for the first cooling air path consists of the compressor outlet 116. If the first cooling air path serves only to cool the rotor, the cooling air can be guided from the plenum 114 directly to the annular gap 145 formed between the rotor 103 and the stationary rotor shroud 144, without being previously guided through the first guide vane row 130.

Since the bleed point 148 of the second cooling air path is located in the compressor section upstream of the compressor outlet 116, the pressure at the bleed point 148 of the second cooling air path is lower than the pressure in the first cooling air path, which is determined by the pressure at the compressor outlet 116. Supplying the cooling air of the first cooling air path into the second cooling air path is therefore simple owing to the pressure difference between the two cooling air paths. In addition, the mass flow rate in the first cooling air path is smaller than that required in the second cooling air path, approximately by a factor of 3-4. This is because the number and size of the guide vanes to be cooled in the first guide vane row are smaller than the number and size of the guide vanes in the second guide vane row, and therefore the mass flow required for cooling the first guide vane row is lower than the mass flow required for cooling the second guide vane row. Even if the temperature of the cooling air released from the first cooling air path into the second cooling air path is above the temperature of the cooling air bled from the compressor for the second cooling air path, the markedly smaller mass flow of cooling air from the first cooling air path in comparison to the air mass flow bled from the compressor for the second cooling air path causes only a minor rise in the temperature of the cooling air of the second cooling air path, which is not critical for the cooling function to be performed by the second cooling air path (in particular cooling of the guide vanes of the second guide vane row). By contrast, the problematic supply of used cooling air from the first cooling air path into the flow path of the compressor can be avoided by supplying the cooling air of the first cooling air path into the plenum 147 of the second cooling air path. Supplying the used cooling air of the first cooling air path into the flow path via the compressor in this manner would be critical in that the aerodynamics in the flow path through the compressor react very sensitively to disturbances, and it would therefore be necessary to meet complex requirements in terms of the mechanism for discharging the cooling air of the first cooling air path into the flow path of the compressor. By contrast, the requirements for discharging the cooling air of the first cooling air path into the second cooling air path are less complex and are therefore easier to meet. If the temperature conditions and mass flow conditions in the first and second cooling air path allow, the bleed point 148 of the second cooling air path can even be closed, such that the second cooling air path is supplied with cooling air solely by the first cooling air path.

Figure 3:
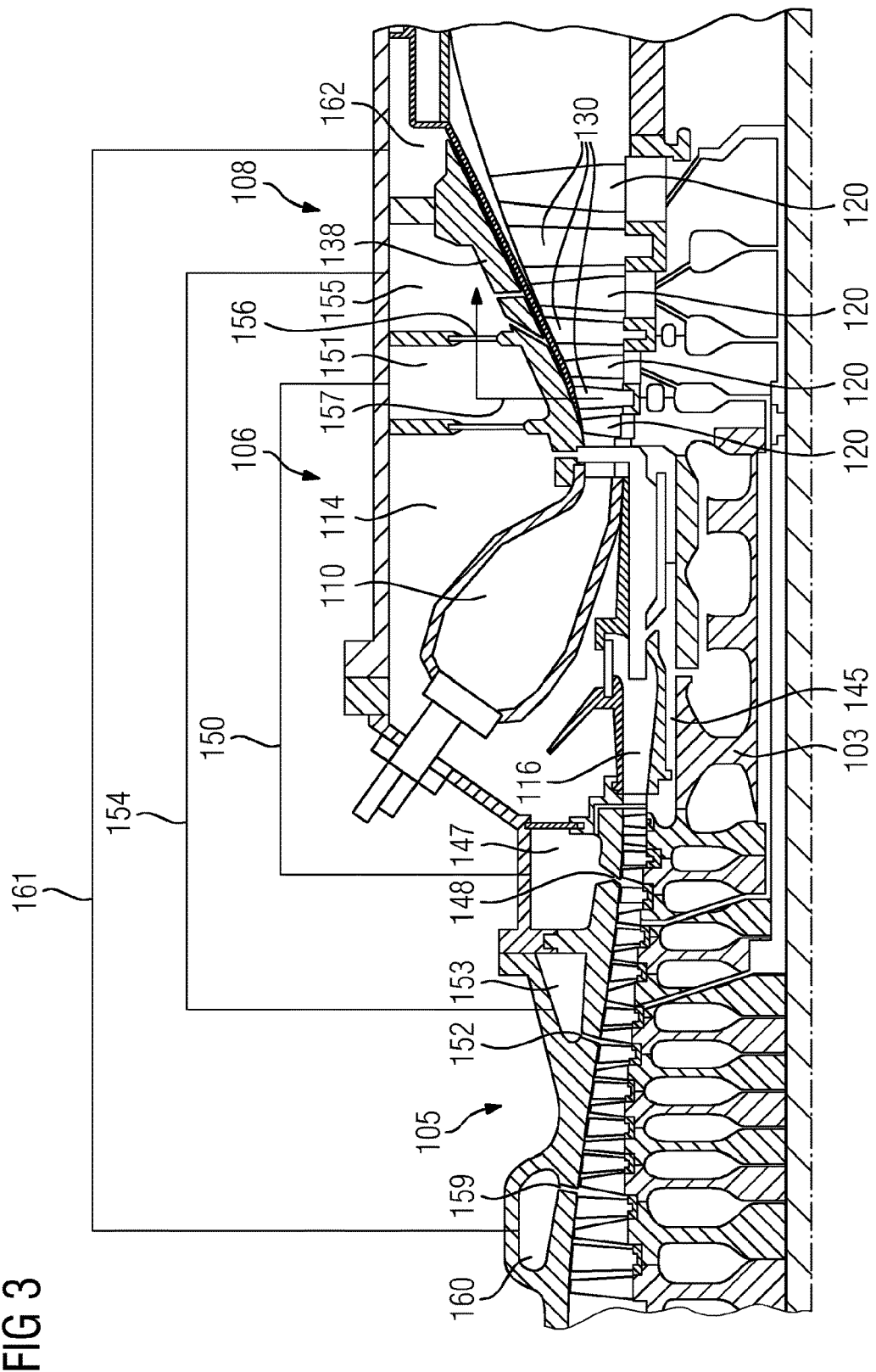
FIG. 3 shows a second exemplary embodiment of a cooling air path in a gas turbine unit according to the invention.

A second exemplary embodiment for a first and a second cooling air path in a gas turbine unit according to the invention is shown in FIG. 3. Therein, the first cooling air path corresponds to the second cooling air path from the first exemplary embodiment. It leads from the bleed point 148 through the plenum 147 in the compressor and a bypass line 150 which bypasses the combustion chamber section 106, into a plenum 151 in the turbine section 108 and thence to the guide vanes 130 of the second guide vane row of the turbine section 108. After flowing through the guide vanes, the cooling air of this cooling air path is discharged into a second cooling air path which serves to cool the guide vanes 130 of the third guide vane row.

The second cooling air path has, in the compressor 105, a bleed point 152 which is arranged upstream of the bleed point 148 of the first cooling air path. The pressure of the second cooling air path is therefore lower than the pressure of the first cooling air path. From the bleed point 152, the second cooling air path runs through a plenum 153 arranged in the compressor 105, a bypass line 154 which bypasses the combustion chamber section 106 of the gas turbine unit, and a plenum 151 in the turbine section 108 to the third guide vane row and possibly to a wall section, bounding the flow path through the turbine, of the inner casing 138 of the turbine 108.

In the present exemplary embodiment, the discharge of cooling air from the first cooling air path into the second cooling air path is effected by lines which lead from the guide vanes 130 of the first guide vane row, through the plenum 151 of the first cooling air path in the turbine section 108, to a feed-in point 156 in the second cooling air path. In the present exemplary embodiment, the lines are indicated by the arrow 157. The feed-in point 156 in the second cooling air path is located in the plenum 155 upstream of the turbine vane row that is to be cooled and upstream of any wall element of the inner casing 138 that is to be cooled.

Although in the present exemplary embodiment the cooling air of the first cooling air path, after flowing through the guide vanes of the second guide vane row, is guided to the feed-in point in the second cooling air path by means of lines routed through the plenum 101, located in the turbine section 108, of the first cooling air path, it is also possible to guide the cooling air through lines which run through the wall section of the inner casing 138 that is located between the plena 151, 155 and the guide vanes 130.

In the present exemplary embodiment, the cooling air of the second cooling air path is discharged into the flow path of the turbine after cooling the guide vanes 130 of the third guide vane row. Alternatively, however, there is also the possibility of discharging the cooling air into another cooling air path instead of into the flow path of the turbine after cooling the guide vanes 130 of the third guide vane row. This other cooling air path is shown in FIG. 3 as the third cooling air path which leads from a bleed point 159, which is upstream of the bleed point 152 of the second cooling air path, through a plenum 160 in the compressor 105, a bypass line 161 bypassing the combustion chamber section 106, and a plenum 162 in the turbine section 108 to the guide vanes 130 of the fourth guide vane row, and possibly to wall elements of the inner casing 138 bounding the flow path through the gas turbine. After flowing through the guide vanes 130 of the fourth guide vane row, and possibly the wall elements, the cooling air is then discharged to outside the gas turbine unit or into the flow path in the exhaust gas casing 109 of the gas turbine unit.

As was the case for discharging the cooling air of the first cooling air path into the second cooling air path, when the cooling air of the second cooling air path is discharged into the third cooling air path the cooling air can be guided through lines, which lead through the plenum 155 of the second cooling air path in the turbine section 108, to the plenum 162 of the third cooling air path in the turbine section 108. Alternatively, the lines can be routed through a wall section of the inner casing 138.

Although the first cooling air path of the first exemplary embodiment is not described with reference to the second exemplary embodiment, a person skilled in the art will recognize that it is also possible to embody the first cooling air path from the first exemplary embodiment in the second exemplary embodiment. This cooling air path would then be installed in front of the first cooling air path of the second exemplary embodiment, such that then up to four cooling air paths are connected in sequence one behind the other, wherein the cooling air used by one cooling air path is discharged into that cooling air path having the next-highest pressure. In that context, use is made of the fact that the cooling air paths are at different pressures owing to their different bleed points in the compressor, the highest pressure being realized in the first cooling air path of the first exemplary embodiment, the then next-highest pressure being in the first cooling air path of the second exemplary embodiment (which corresponds to the second cooling air path of the first exemplary embodiment), the next-highest pressure being in the second cooling air path of the second exemplary embodiment, and the lowest pressure being in the third cooling air path of the second exemplary embodiment. In addition, the mass flows of the cooling air paths are also different, the mass flows being lower the higher the pressure of the respective cooling air path. Therefore, the lowest mass flow is in the first cooling air path of the first exemplary embodiment and the highest mass flow is in the third cooling air path of the second exemplary embodiment. For that reason, the influence on the cooling air paths from discharging the cooling air into a lower-pressure cooling air path is relatively unimportant with regard to the aerodynamics and the thermodynamics in the receiving cooling air path.

The present invention has been explained in greater detail for explanatory purposes with reference to exemplary embodiments. As already clear from the description of the exemplary embodiments, variations on the exemplary embodiments are possible. In particular, the bleed points of the second cooling air path and/or of the third cooling air path and/or of the fourth cooling air path can be closed if the temperature conditions and mass flow conditions in the individual cooling air paths allow, such that two or more cooling air paths, or even all of the cooling air paths, are supplied solely with the cooling air from the first cooling air path bled from the flow path of the gas turbine unit. The invention is therefore intended to be limited not by the exemplary embodiments, but by the appended claims.

The invention claimed is:
1. A gas turbine unit having comprising:
a compressor section, a combustion chamber section containing at least one combustion chamber, and a turbine section, wherein a flow path extends, proceeding from a compressor inlet, through the compressor section,
at least one combustion chamber of the combustion chamber section and the turbine section to a turbine outlet, and having at least one first and one second cooling air path which bypass the at least one combustion chamber, wherein the first cooling air path bleeds compressor air from the flow path upstream of the at least one combustion chamber, and wherein the cooling air paths guide compressor bleed air as cooling air through or along turbine components in the turbine section and/or in the combustion chamber section,
wherein the first cooling air path is at a higher pressure than the second cooling air path and, after cooling the gas turbine components to be cooled by the first cooling air path, feeds the cooling air into the second cooling air path at a feed-in point,
wherein the second cooling air path has a bleed point in the compressor section and extends from the compressor section, bypassing the at least one combustion chamber, to the turbine section, wherein in the compressor section the second cooling air path bleeds air from the flow path and guides this as cooling air through or along turbine components in the turbine section and/or in the combustion chamber section,
wherein, at the feed-in point, the first cooling air path, after cooling the gas turbine components to be cooled by the first cooling air path, feeds the cooling air into the second cooling air path as cooling air in addition to the air of the second cooling air path bled in the compressor section from the flow path,
wherein the feed-in point in the second cooling air path is arranged in a part of the second cooling air path located in the compressor section, downstream of the bleed point of the second cooling air path.
2. The gas turbine unit as claimed in claim 1, wherein the first cooling air path leads in sequence through a gap between the rotor and a rotor shroud surrounding the rotor in the combustion chamber section, and through a final guide vane row of the compressor section, to the feed-in point into the second cooling air path.

* * * * *